US012673553B2

(12) United States Patent
Breitschaft et al.

(10) Patent No.: US 12,673,553 B2
(45) Date of Patent: Jul. 7, 2026

(54) CONTROL DEVICE AND METHOD FOR ACTUATING AN ACTIVE HAPTIC OPERATING ELEMENT FOR A MOTOR VEHICLE

(71) Applicant: Bayerische Motoren Werke Aktiengesellschaft, Munich (DE)

(72) Inventors: Stefan Breitschaft, Nabburg (DE); Thomas Hilger, Iffeldorf (DE); Christian Knoll, Munich (DE); Stephan Mueller, Munich (DE); Hannes Trapp, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/884,223

(22) Filed: Sep. 13, 2024

(65) Prior Publication Data

US 2025/0121686 A1 Apr. 17, 2025

(30) Foreign Application Priority Data

Oct. 16, 2023 (DE) ...................... 10 2023 128 285.9

(51) Int. Cl.
*B60K 35/25* (2024.01)
*B60K 35/22* (2024.01)
*G06F 3/01* (2006.01)

(52) U.S. Cl.
CPC .............. *B60K 35/25* (2024.01); *B60K 35/22* (2024.01); *G06F 3/016* (2013.01); *B60K 2360/178* (2024.01)

(58) Field of Classification Search
CPC .. B60K 2360/178; B60K 35/10; B60K 35/22; B60K 35/25; B60K 35/26;
(Continued)

(56) References Cited

U.S. PATENT DOCUMENTS

2010/0302199 A1* 12/2010 Taylor ..................... G06F 3/046
345/174
2019/0152388 A1 5/2019 Frey et al.
(Continued)

FOREIGN PATENT DOCUMENTS

DE 10 2017 127 231 A1 5/2019
DE 10 2019 213 213 A1 3/2021
(Continued)

OTHER PUBLICATIONS

German-language Office Action issued in German Application No. 10 2023 128 285.9 C1 dated Jun. 14, 2024 (4 pages).

*Primary Examiner* — Dionne Pendleton
(74) *Attorney, Agent, or Firm* — Crowell & Moring LLP

(57) ABSTRACT

A control device actuates an active haptic operating element for a motor vehicle. The control device is designed to determine whether there is an activation of the operating element; to determine whether the operating element is assigned an available function if an activation of the operating element has been determined; and to actuate the operating element to emit an active haptic positive feedback when an activation of the operating element has been determined, and it has been determined that the operating element is assigned an executable function. The control device is designed to actuate the operating element to emit an active haptic negative feedback when an activation of the operating element has been determined, and it has been determined that no executable function is assigned to the operating element. The active haptic positive feedback and the active haptic negative feedback differ from one another.

9 Claims, 7 Drawing Sheets

(58) Field of Classification Search
CPC ........ B60K 2360/141; B60K 2360/691; B60K
2360/111; B60K 2360/113; B60K
2360/1438; B60K 2360/1468; B60K
2360/589; B60K 2360/794; B60K
2360/96; B60K 35/00; B60K 35/50;
B60K 35/60; B60K 35/80; B60K 35/85;
B60K 35/90; B60K 2360/143; B60K
2360/48; B60K 2360/816; B60K
2360/1446; B60K 20/06; B60K 2360/782;
B60K 35/212; B60K 2360/126; B60K
28/06; B60K 2360/1434; B60K 35/21;
H04W 4/80; G08B 6/00; H01F 7/081;
B60N 2/0276; Y02D 10/00; H04S 7/303;
H04R 1/028; H04R 1/345; H04R
2201/025; H04R 2499/15; H04R 3/00;
G09G 2330/02; G09G 2354/00; B62D
15/029; B62D 1/046; B62D 15/025;
B62D 15/0265; B62D 5/008; B60Q 9/00;
B60Q 1/0082; B60Q 9/008; B60W 50/16;
G06F 3/016; G06F 1/3228; G06F 1/3265;
G06F 3/011; G06F 3/017; G06F 3/0202;
G06F 3/03547; G06F 3/0488; G06F 3/14;
G06F 3/147; G06F 2203/014; G06F
3/041; G06F 3/0482; G06F 3/0485; G06F
3/02; G06F 3/0416; G06F 3/03; G06F
3/0481; G06F 3/04883; G06F 3/167;
G06F 1/1601; G06F 1/1626; G06F 1/163;
G06F 1/1684; G06F 3/014; G06F 3/0362;
G06F 3/038; G06F 3/0383; G06F 3/046;
G06F 3/04842; H03K 2217/96062; H03K
17/96; H03K 2217/94057; H03K
2217/94089; H03K 2217/96031; D06F
2105/58; D06F 34/32; A47L 15/4293;
F16H 2063/423; F16H 59/0204; F16H
59/0278; F16H 59/044; F16H 61/24;
F16H 63/42; F24C 7/083; F24C 7/086;
F24F 11/89; F25D 2400/361; B60R
2325/20; B60R 25/209; B60R 25/24;
B60R 25/241; B60R 16/005; H02N 2/18;
H04M 19/04; G05G 1/04; G05G
2009/04766; G05G 5/03; G05G 9/047;
G04G 21/08; E02F 3/964; E02F 9/2004;
E02F 9/2012; E02F 9/2066
See application file for complete search history.

(56) References Cited

U.S. PATENT DOCUMENTS

| | | | |
|---|---|---|---|
| 2019/0193652 A1* | 6/2019 | Unveren | B60Q 9/00 |
| 2023/0158886 A1 | 5/2023 | Mueller et al. | |
| 2024/0143090 A1* | 5/2024 | Battlogg | G06F 3/04842 |
| 2024/0184375 A1 | 6/2024 | Breitschaft et al. | |

FOREIGN PATENT DOCUMENTS

| | | |
|---|---|---|
| DE | 10 2020 107 338 A1 | 9/2021 |
| DE | 10 2022 200 015 A1 | 7/2023 |
| DE | 10 2022 131 902 A1 | 6/2024 |

* cited by examiner

CONTROL DEVICE AND METHOD FOR ACTUATING AN ACTIVE HAPTIC OPERATING ELEMENT FOR A MOTOR VEHICLE

CROSS REFERENCE TO RELATED APPLICATION

This application claims priority under 35 U.S.C. § 119 from German Patent Application No DE 10 2023 128 285.9, filed Oct. 16, 2023, the entire disclosure of which is herein expressly incorporated by reference.

BACKGROUND AND SUMMARY

The present disclosure relates to a control device for actuating an active haptic operating element for a motor vehicle, to an active haptic operating unit which comprises the control device, to a motor vehicle which comprises the control device, and/or to a method for actuating an active haptic operating element for a motor vehicle. Additionally, or alternatively, provided is a computer program which comprises commands which, when carrying out the program by a computer, instruct the latter to at least partially carry out the method. Additionally, or alternatively, provided is a computer-readable medium which comprises commands which, when executing the commands by a computer, instruct the latter to at least partially carry out the method. Therefore, the invention is in the field of operating elements for motor vehicles.

Traditionally, operating elements are embodied as individually suspended and guided buttons. Operating feedback is purely mechanical and depends on the mechanical elements used, such as springs and silicone domes, etc. Pressing a button therefore always results in haptic operating feedback, even if the function assigned to the button is not usable, such as in the case of a functionless "telephone" button which may also be installed, under certain circumstances, in automobiles that are not equipped with a telephone connection for reasons of variant minimization. In addition, operating units with pressably suspended panels that house a plurality of buttons are known in the prior art. The position of the finger on the panel is evaluated in this case and the corresponding function, which is stored at the selected location, is triggered. In this case, too, operating feedback is purely mechanical and therefore independent of whether or not the function can be executed. Therefore, the same unchanged operating feedback is emitted even when a function is not available. A user can therefore not recognize whether the desired function has actually been executed, or the user may assume that the desired function has actually been executed even if this is potentially not the case.

Moreover, multi-function operating devices with an active haptic feature are also known in the prior art and described in DE 10 2017 127 231 A1, for example.

Against the background of this prior art the object of the present disclosure lies in providing a device and/or a method which are in each case/is suitable for enhancing the prior art, for example for providing improved operating units and/or an improved availability of haptic feedback for operating elements. A specific design embodiment of the disclosure can achieve the object of providing a scope of freedom of design in terms of haptic feedback of operating elements.

The object is achieved by the features of the independent claims. The dependent claims contain in each case optional refinements of the disclosure.

Accordingly, the object is achieved by a control device for actuating an active haptic operating element for a motor vehicle.

The control device is designed to determine whether there is an activation of the operating element.

The control device is designed to determine whether the operating element is assigned an available function if an activation of the operating element has been determined.

The control device is designed to actuate the operating element to emit an active haptic positive feedback when an activation of the operating element has been determined, and it has been determined that the operating element is assigned an executable function.

The control device is designed to actuate the operating element to emit an active haptic negative feedback when an activation of the operating element has been determined, and it has been determined that no executable function is assigned to the operating element. The active haptic positive feedback and the active haptic negative feedback differ from one another.

The prefixes "positive" and "negative" serve only to differentiate the two defined types of active haptic feedback. In other words, the active haptic positive feedback and the active haptic negative feedback are types of active haptic feedback that differ from one another.

"Active haptic" can be understood to mean that a haptic feedback is not provided, or at least not exclusively provided, by passive mechanical elements such as restoring springs and/or silicone domes, but by an active actuator which can be correspondingly actuated. In other words, providing an actuator in the operating element and a suitable actuation for the actuator can be required for providing an active haptic feedback. For example, the actuator can comprise a piezo-electric actuator, or be designed as such. Alternatively or additionally, the actuator can have other customary actuator types, e.g. solenoids and/or voice coils.

A haptic feedback can be an event which can be haptically experienced and which can be emitted to the user. In particular, a haptic feedback by means of which a successful activation of the operating element is able to be identified can be emitted when activating the operating element. The haptic feedback can optionally comprise a vibration, a pulse, a vibration pattern, a pulse intensity, a vibration intensity and/or a deflection. The haptic feedback can optionally be accompanied by an acoustic feedback, this nevertheless not being mandatory.

The positive feedback and the negative feedback can differ from one another in terms of, for example, different vibrations, pulses, vibration patterns, pulse intensities, vibration intensities and/or deflections.

An activation of the operating element herein can represent carrying out a switching procedure using the operating element, in a manner conforming to the intended use. If the operating element is designed as a pushbutton, the activation can consist in pushing the pushbutton beyond a potential predetermined pressure point. If the operating element is designed as a rocker switch, the activation can optionally consist in a tilting movement beyond a potential predetermined threshold.

Determining an activation of the operating element can optionally comprise determining a physical contact with the operating element. This can be advantageous in particular with operating elements which have a touchscreen operating surface. Determining an activation of the operating element herein can optionally comprise determining a position at which the operating element has been touched. An evaluation as to whether or not there is an activation of the operating element can then take place as a function of the position of the physical contact. For instance, it can be determined whether the operating element has been touched at the provided location, whether the operating element is or has been assigned a function at the point in time of physical contact, and whether a predetermined force threshold has been exceeded during physical contact in order to be considered an activation of the operating element.

That the operating element can be assigned a function herein means that the activation of the operating element signals a user input with the instruction to execute a function that is connected with the operating element, if this function is executable. It is also possible herein that no function is assigned to the operating element, or the assigned function is not executable. Alternatively or additionally, the operating element may be only temporarily assigned a function, or different functions may be assigned to the operating element at different times.

The operating element and/or the operating unit can optionally be formed in a steering wheel of the motor vehicle. However, the present disclosure is not limited thereto, but can be used, for example, in any type of display screen direct operation and display screen remote operation.

The function being able to be executable means that the activation of the operating element results in an execution of the function, for example within the motor vehicle. It is contemplated here that, in addition to the activation of the operating element, one or a plurality of, for example technical, conditions have to be met, the verification of these conditions being initiated by activating the operating element, for example. One of these conditions can be, or it can be verified in addition to these conditions, that the function can be flawlessly executed, i.e. there are no technical faults, for example in the system which is responsible for executing the function. In this way it is possible that the operating element is assigned a function (or else a plurality of functions) which however cannot be executed. Conversely, no executable function can be assigned when no function is assigned, or a function that is however not executable is assigned.

Emitting the active haptic feedback (i.e. the positive feedback, or the negative feedback) herein means that an event which the user can haptically experience on the operating element is initiated. This can optionally comprise emitting control signals to an actuator of the operating element in such a way that the actuator causes a movement of the operating element that can be haptically perceived.

The control device described above offers a raft of advantages. Provided, inter alia, is an improved technology which enables active haptic feedback to be provided as a function of a context. By means of different types of active haptic feedback a user, e.g. the driver of the motor vehicle, when activating the operating element receives the information pertaining to whether the activation of the operating element also results in initiating a function which is connected with the operating element, or no function is to be executed, without this requiring visual verification by the user, as a result of feedback being emitted in both potential cases—the presence of an executable function or not executable function—the user additionally obtains the information that the operating element has been correctly activated.

Consequently, the disclosure offers the advantage that the ability to blindly operate the operating element is improved because the user, by means of the different types of active haptic feedback, obtains reliable information pertaining to the acceptance or non-acceptance of the input command, and thus is informed about the current state of the system, the user not having to direct his/her sight to a potential connected display screen for carrying out visual verification. Distractions of the user, for example of the driver of the motor vehicle, are thus minimized because it is unnecessary to avert one's sight, for example from the road to a display screen (or a display). Furthermore, it is possible, for example, "to test" the function(s) in terms of its/their availability, without having to avert one's sight from the road.

A distraction of the user is thus avoided by the disclosure. Moreover, so-called dead ranges can be defined by suppressing the emission of the active haptic positive or negative feedback, as a result of which operating errors can be avoided. Consequently, the level of safety when operating the motor vehicle and thus the safety in highway traffic can be increased by the disclosure. Likewise, a situation-dependent positive or negative feedback can be emitted as a result. In this way, different types of feedback which in turn differ between positive feedback and negative feedback can be emitted to the user for one and the same symbolism, or user input, respectively, in different situations, for example as a function of the driving status.

The disclosure moreover offers the advantage that an operating unit having one or a plurality of operating elements can be provided with a monolithic and/or seamless design, and haptic feedback can nevertheless be provided and emitted to the user by way of the operating element. As a result, scopes of freedom in the design of the operating unit can be increased.

Potential refinements of the control device just described will be explained in detail hereunder.

The control device can be designed to differentiate to establish that no executable function is assigned when no function is permanently or temporarily assigned, and/or an assigned function is not executable because (at least) one condition is not met, and/or an assigned function is not executable due to a technical fault, for example. The (at least) one condition can comprise, for example, a minimum activation time of the operating element (when activating the operating element) and/or a technical condition that a system of the motor vehicle can execute the function.

The control device can be designed to additionally actuate a display of the motor vehicle to display a visual warning when an activation of the operating element has been determined, and it has been determined that no executable function is assigned to the operating element.

The control device can be designed to additionally actuate at least one loudspeaker of the motor vehicle to emit an acoustic warning when an activation of the operating element has been determined, and it has been determined that no executable function is assigned to the operating element. A redundant feedback pertaining to the absence of an executable function is advantageously enabled by the additional visual and/or acoustic warning.

When it has been determined that the operating element is assigned an executable function, the control device can be designed to further determine a functional characteristic assigned to the operating element. The active haptic positive feedback can depend on the assigned functional characteristic determined. In other words, the control device (for actuating the operating element to emit the active haptic positive feedback) can be designed to actuate the operating element to emit the active haptic positive feedback as a function of the assigned functional characteristic determined. This can take place in particular when different functions can be assigned to the operating element at different points in time.

This offers the advantage that the user can optionally recognize by means of the active haptic feedback, without visual verification, which function is executed by activating the operating element. The functional characteristic can represent a type of function, for example. Different types of functions can relate to, for example, functions for the driving operation such as, for instance, speed control and/or lane departure control, as well as to functions for controlling media output and/or functions for controlling communications connections such as, for instance, a phone connection. As a result, the level of safety when operating the motor vehicle can be increased because the user, by means of the haptic feedback, can optionally identify whether a desirable or undesirable type of function has been activated at an early stage and without visual verification.

The operating element can be activatable in a first switching position and in a second switching position.

The control device can be designed to differentiate whether there is an activation of the operating element in the first switching position or in the second switching position if an activation of the operating element has been determined.

The active haptic positive feedback can comprise a first active haptic positive feedback when there is an activation of the operating element in the first switching position, and a second active haptic positive feedback when there is an activation of the operating element in the second switching position. In other words, the control device (for actuating the operating element to emit the active haptic positive feedback) can be designed to actuate the operating element to emit the first active haptic positive feedback when an activation of the operating element in the first switching position has been determined, and it has been determined that the operating element is assigned an executable function, and to actuate the operating element to emit the second active haptic positive feedback when an activation of the operating element in the second switching position has been determined, and it has been determined that the operating element is assigned an executable function.

The active haptic negative feedback can comprise a first active haptic negative feedback when there is an activation of the operating element in the first switching position, and a second active haptic negative feedback when there is an activation of the operating element in the second switching position. In other words, the control device (for actuating the operating element to emit the active haptic negative feedback) can be designed to actuate the operating element to emit the first active haptic negative feedback when an activation of the operating element in the first switching position has been determined, and it has been determined that no executable function is assigned to the operating element, and to actuate the operating element to emit the second active haptic negative feedback when an activation of the operating element in the second switching position has been determined, and it has been determined that no executable function is assigned to the operating element.

This offers the advantage that a plurality of different functions can be selected by gradually activating the operating element, and an active haptic positive or negative feedback confirms in each case to the user that the associated switching state has been reached, respectively. Alternatively, more than two different switching positions, and optionally more than two different types of active haptic positive or negative feedback associated therewith can be provided.

There can be activation of the operating element in the first switching position by exceeding a first switching threshold, and there can be activation of the operating element in the second switching position by exceeding a second switching threshold. Exceeding the second switching threshold can occur in an activation movement which is in the same direction and is more pronounced than an activation movement for exceeding the first switching threshold. As a result, a plurality of functions can be assigned to a single operating element in a manner which is simple and intuitive to operate. The more pronounced activation movement can consist of a greater activating force, or can comprise a greater activating force. In the case of an operating element in the form of a pushbutton, for example, the first switching threshold can be reached by pushing by way of a first button pressure, and the second switching threshold can be reached by pushing by way of a second button pressure which is greater than the first button pressure. This offers the advantage that the user can easily differentiate between the first and the second switching position.

The more pronounced activation movement can consist of a greater activating force, or comprise a greater activating force.

For differentiating (whether there is an activation of the operating element in the first switching position or in the second switching position), the control device can be designed to determine an activation of the operating element in the first switching position when the first switching threshold is exceeded once a first return threshold has been exceeded. In other words, in order to identify an activation of the operating element in the first switching position, it may be necessary for a first return threshold lying therebelow to be first exceeded so that exceeding the first switching threshold is identified as an activation procedure. This can take place in that the first return threshold and the first switching threshold are exceeded for the first time when activating the operating element, or in that the activation of the operating element has been reduced or lessened in the meantime without the activation having been completely interrupted, to the extent that the activation has dropped below the first return threshold again.

For differentiating (whether there is an activation of the operating element in the first switching position or in the second switching position), the control device can be designed to determine an activation of the operating element in the second switching position when the second switching threshold has been exceeded once a second return threshold has been exceeded. In other words, in order to identify an activation of the operating element in the second switching position, it may be necessary for a second return threshold lying therebelow to be first exceeded so that exceeding the second switching threshold is identified as an activation procedure. This can take place in that the second return threshold and the second switching threshold are exceeded for the first time when activating the operating element, or in that the activation of the operating element has been reduced or lessened in the meantime to the extent that the activation has dropped below the second return threshold again without the activation having been completely interrupted, and without the activation having dropped below the first return threshold again.

The first return threshold can be configured below the second return threshold, and the second return threshold can be configured below the first switching threshold. In this context, "below" means that a less pronounced activation has to take place, or that a lower activating force is required for reaching the respective threshold than for reaching switching thresholds that lie above this threshold.

The operating element can be switchable repeatedly between the first switching position and the second switching position by means of repeatedly exceeding the second switching threshold and repeatedly falling short of the second return threshold, without completely canceling an activation of the activation element. This offers the advantage of switching or "toggling" between the first and the second switching state. This enables an intuitive and simple repeated activation of the operating element in the different switching states without having to interrupt the activation. In this way, for example, scrolling through a list can take place by means of the first switching position, and clicking or activating the selected element in the list during the activation of the operating element can take place by means of the second switching position.

The first active haptic positive feedback, the second active haptic positive feedback, the first active haptic negative feedback and the second active haptic negative feedback can optionally differ from one another. This offers the advantage that the user obtains information pertaining to which switching position of the operating element has been activated and, optionally, to which function is executed or available as a result, based on the haptic feedback and without visual verification.

In other words, what has been described above can be summarized with a view to a potential specific design embodiment of the disclosure as follows, the description hereunder not to be understood as limiting the disclosure.

According to the present disclosure, a different active haptic feedback, or another active haptic feedback, can be emitted in the case of a non-available function than in the case of an available function.

An emission can also take place in the case of a negative feedback. A negative feedback can be helpful for the user inter alia, but not exclusively, in the following cases; there is no permanently or temporarily stored function; the expected stored function cannot be executed because a fundamental condition required for this purpose has not been met; the expected stored function cannot be executed because of a fault being present which leads to the non-availability.

The negative feedback can take place by way of an active haptic element which emits an active haptic signal which can be differentiated from the positive feedback. The negative feedback can redundantly duplicate or replace a visual display in a display screen or an acoustic feedback. The negative feedback can enable a new functionality of the display of a non-function.

For use in motor vehicle, the distraction of the driver has to be minimized as far as possible. Averting one's sight (for example from the road to a display screen) can be further minimized by the present disclosure. It can become possible to "test" functions in terms of their availability (i.e. simply test whether the function is currently working) without having to avert one's sight from the road. This can offer a great benefit in terms of "state awareness", thus the knowledge pertaining to the current state of the system, which is particularly important in motor vehicles.

Further provided is an active haptic operating unit for a motor vehicle, wherein the active haptic operating unit comprises an active haptic operating element and the control device described above.

It is contemplated that the active haptic operating unit comprises a plurality of active haptic operating elements which are actuatable by the control device.

The active haptic operating unit (or the plurality of active haptic operating units) and the control device can be operatively connected to one another for transmitting signals.

What has been described above with reference to the control device also applies in an analogous manner to the active haptic operating unit and vice versa.

Further provided is a motor vehicle, wherein the motor vehicle comprises the active haptic operating unit described above (and/or the control device described above).

The motor vehicle can be a passenger motor vehicle, in particular an automobile, or a commercial vehicle such as, for example, a motor truck.

What has been described above with reference to the control device and with reference to the active haptic operating unit also applies in an analogous manner to the motor vehicle and vice versa.

Further provided is a method for actuating an active haptic operating element for a motor vehicle.

The method comprises determining whether there is an activation of the operating element.

The method comprises determining whether the operating element is assigned an available function if an activation of the operating element has been determined.

The method comprises actuating the operating element to emit an active haptic positive feedback when an activation of the operating element has been determined, and it has been determined that the operating element is assigned an executable function.

The method comprises actuating the operating element to emit an active haptic negative feedback when an activation of the operating element has been determined, and it has been determined that no executable function is assigned to the operating element. The active haptic positive feedback and the active haptic negative feedback differ from one another.

The (control) method can be a computer-implemented method, i.e. one, a plurality of, or all steps of the method can be at least partially executed by a computer, or a device for data processing, optionally by the control device.

What has been described above with reference to the control device, with reference to the active haptic operating unit and with reference to the motor vehicle also applies in an analogous manner to the method and vice versa.

Further provided is a computer program comprising commands which when executing the program by a computer instruct the latter to at least partially execute or carry out the method described above.

A program code of the computer program can be in any arbitrary code, in particular in a code suitable for controls of motor vehicles.

What has been described above with reference to the control device, with reference to the active haptic operating unit, with reference to the motor vehicle and with reference to the method also applies in an analogous manner to the computer program and vice versa.

Further provided is a computer-readable medium, in particular a computer-readable storage medium. The computer-readable medium comprises commands which when executing the commands by a computer instruct the latter to at least partially execute or carry out the method described above.

This means that a computer-readable medium can be provided, which comprises a computer program defined above. The computer-readable medium can be any arbitrary digital data storage apparatus such as, for example, a USB stick, a hard disk, a CD-ROM, an SD card, or an SSD card (or SSD drive/SSD hard drive).

The computer program does not have to be mandatorily stored on such a computer-readable storage medium in order to be made available to the motor vehicle, but can also be provided by way of the internet or any other external means.

What has been described above with reference to the method, with reference to the control device, with reference to the active haptic operating unit, with reference to the computer program and with reference to the motor vehicle also applies in an analogous manner to the computer-readable medium and vice versa.

It goes without saying that the features and embodiments mentioned above and explained hereunder are to be considered disclosed not only in the respective explicitly mentioned combinations, but that other technically purposeful combinations and embodiments are also comprised by the content of the disclosure.

Other objects, advantages and novel features of the present invention will become apparent from the following detailed description of one or more preferred embodiments when considered in conjunction with the accompanying drawings.

BRIEF DESCRIPTION OF THE DRA WINGS

Figure 5A:
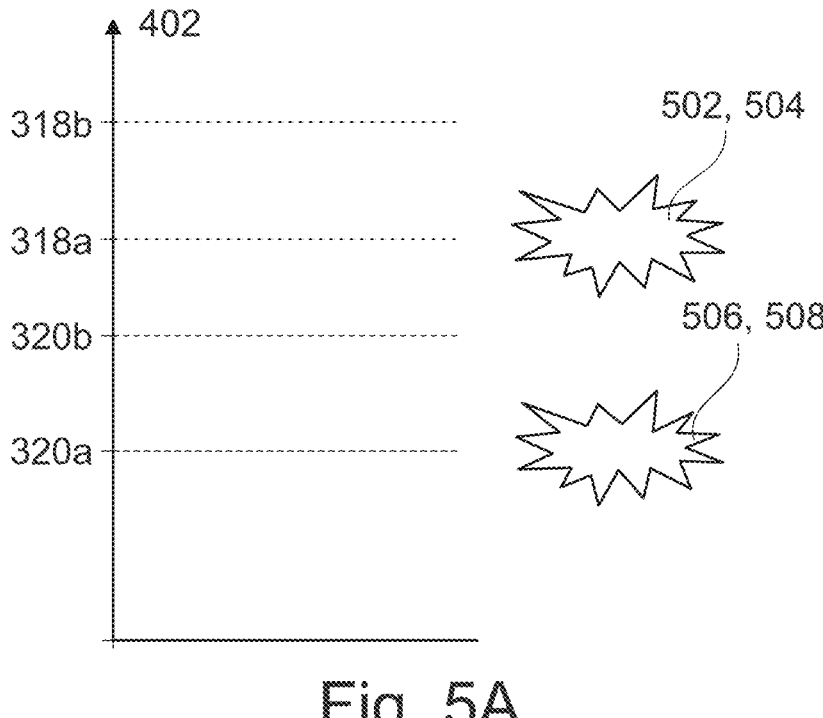
Figure 5B:
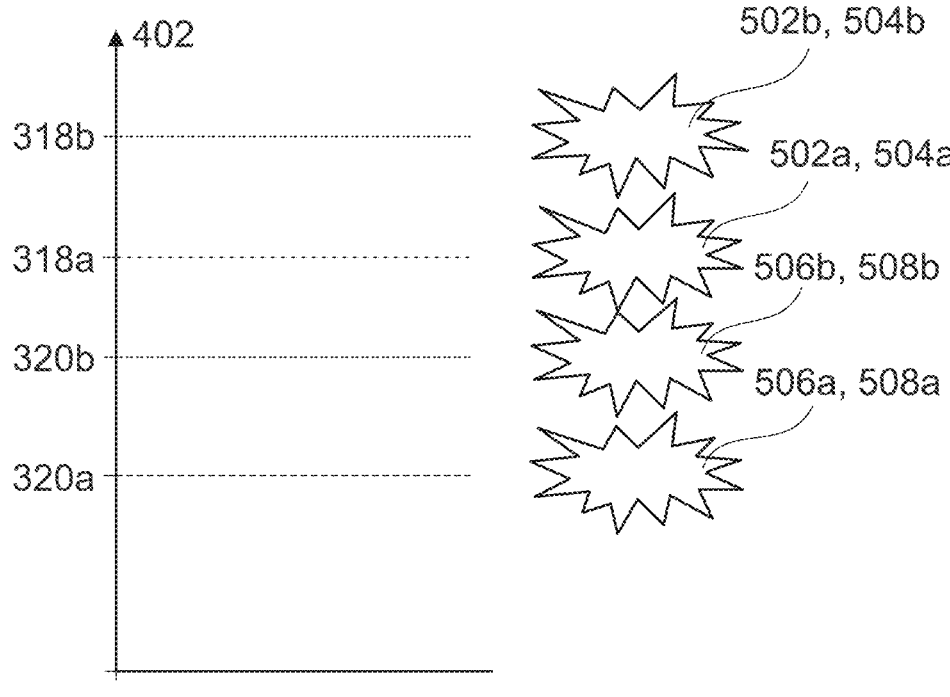
Figure 6:
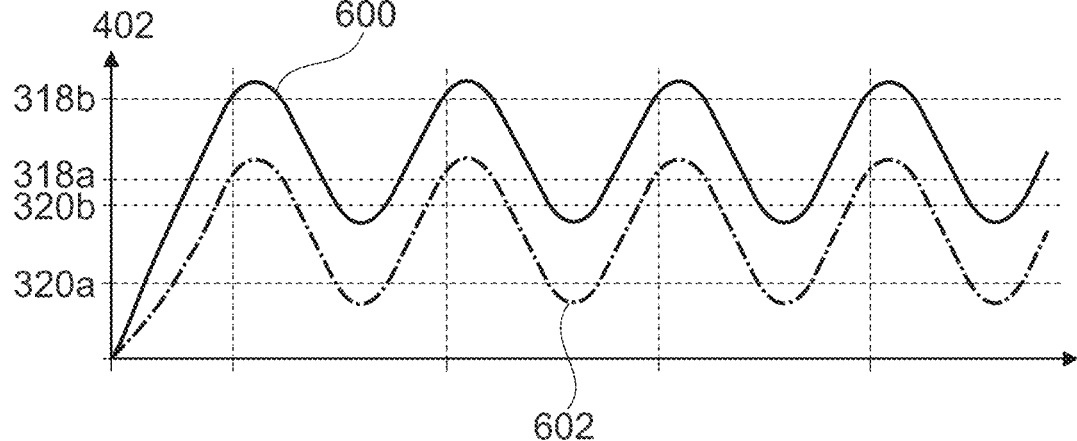
Figure 7:
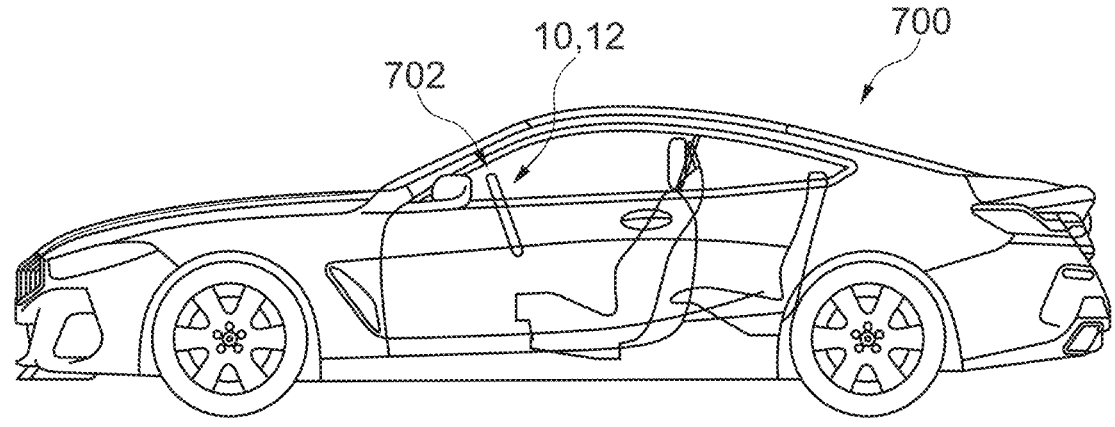

FIG. 5A schematically shows the relative arrangement of the first and the second switching threshold and of the first and the second return threshold in a diagram that illustrates the finger force on the vertical axis;

FIG. 5B shows a case in which the first switching position and the second switching position of the active haptic operating element are differentiated by separate types of active haptic feedback;

FIG. 6 shows a profile of the finger force for activating the operating element multiple times; and FIG. 7 shows, by way of example, a motor vehicle according to an optional embodiment.

In the figures, the same reference signs are used for identical or similar elements. In some descriptions of the figures reference signs are stated even when the respective element is potentially visible only in other figures.

DETAILED DESCRIPTION OF THE DRAWINGS

Figure 1:
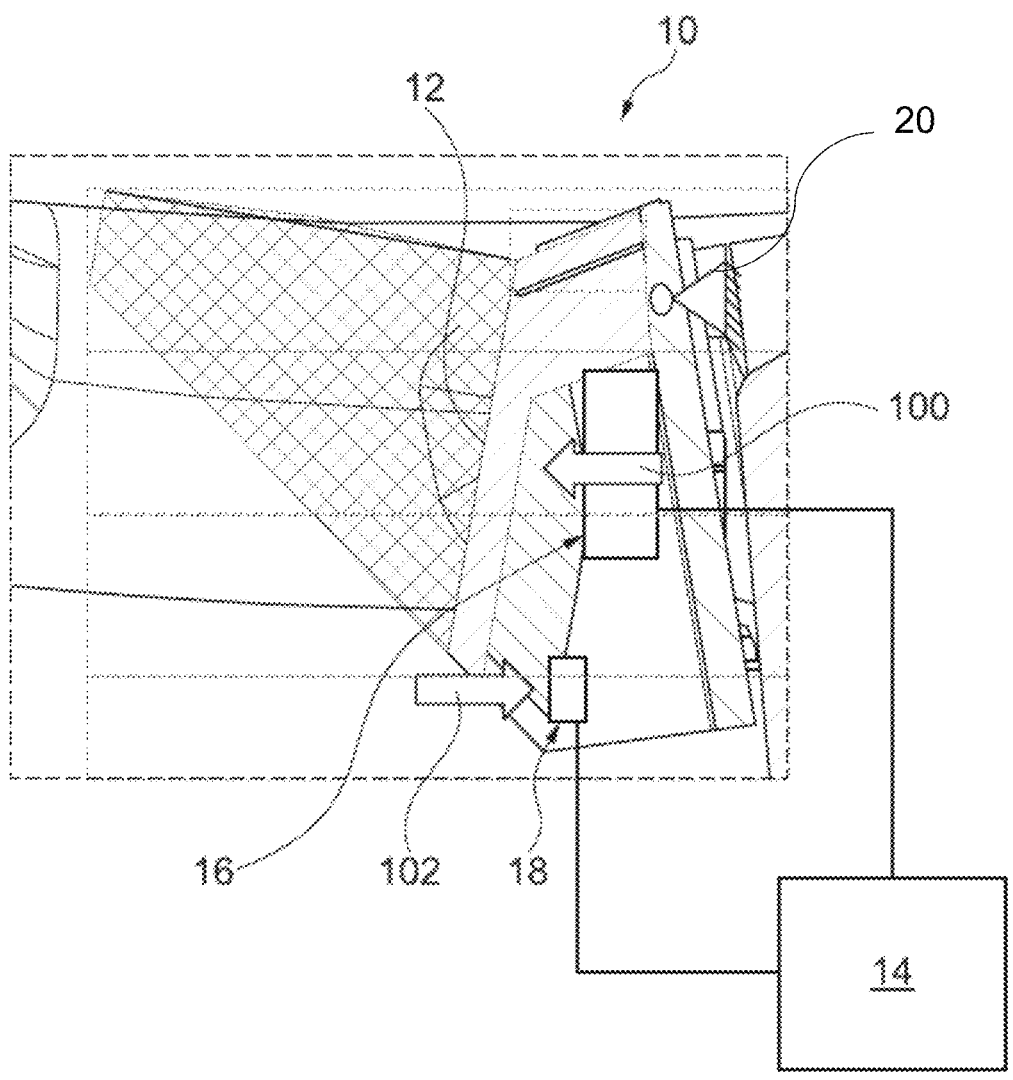
FIG. 1 is a schematic illustration of an active haptic operating unit according to an optional embodiment for a motor vehicle.

FIG. 1 shows the active haptic operating unit 10 according to an optional embodiment for a motor vehicle, in a schematic illustration.

The active haptic operating unit 10 comprises (at least) one active haptic operating element 12 as well as a control device 14 for actuating the (at least one) active haptic operating element 12.

The active haptic operating unit 10 herein can have an actuator 16 and a force sensor 18. The actuator 16 can optionally be designed as a voice coil actuator, or comprise such a voice coil actuator, and be designed to act mechanically on the operating element 12 to generate an active haptic feedback, i.e. an active haptic positive feedback, or negative feedback, respectively. By way of example, arrow 100 shows an effective direction of the actuator 16. The force sensor 18 can optionally be designed as a piezo-resistive force sensor, or comprise such a piezo-resistive force sensor, and be designed to identify a user input on the operating element 12, which is performed by pushing a button, for example, and to generate corresponding sensor signals. By way of example, arrow 102 shows a direction of the effective force in a successful user input. Optionally, the actuator 16 as well as the force sensor 18 are connected to the control device 14 in such a way that the control device 14 can receive the sensor signals from the force sensor 18 and control the actuator 16 in an open loop and/or closed loop to generate an active haptic feedback. The arrow 20 indicates the bearing point of the operating element 12. According to other embodiments, the operating element 12 can be of a different design and permit another kind of activation. According to optional embodiments, an effective direction of the actuator can in particular take place in a plurality of directions, for instance in two spatial directions or in three spatial directions, including the direction in a plane of an operating surface of the operating element 12.

Figure 2:
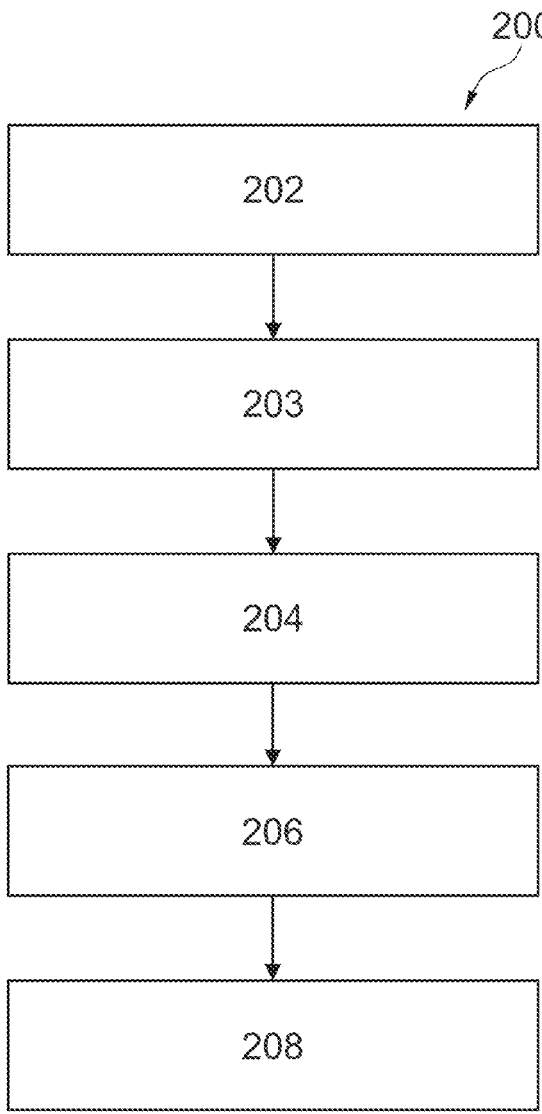
FIG. 2 illustrates a method for actuating an active haptic operating element according to an optional embodiment.

The control device 14 is designed to actuate the active haptic operating element 12 to carry out the method 200 which is described in detail hereunder and also with reference to FIG. 2.

In a first method step 202, it is determined whether there is an activation of the operating element 12.

In a second method step 204, it is determined whether the operating element 12 is assigned an available function if an activation of the operating element 12 has been determined.

It can be established in the process that no executable function is assigned when no function is permanently or temporarily assigned, an assigned function is not executable because a condition is not met, and/or an assigned function is not executable due to a fault.

In a third method step 206, the operating element 12 is actuated to emit an active haptic positive feedback 502 when an activation of the operating element 12 has been determined, and it has been determined that the operating element 12 is assigned an executable function.

It is contemplated here that furthermore a functional characteristic assigned to the operating element 12 can be determined, wherein the emission of the active haptic positive feedback can take place as a function of the assigned functional characteristic determined.

In a fourth method step 208, the operating element 12 is actuated to emit an active haptic negative feedback 504 when an activation of the operating element 12 has been determined, and it has been determined that no executable function is assigned to the operating element 12, wherein the active haptic positive feedback 502 and the active haptic negative feedback 504 differ from one another.

The two method steps 206 and 208 can be carried out simultaneously or successively in any arbitrary sequence. It is contemplated that the third method step 206 is first carried out and subsequently, for example if the condition in the third method step 206 has not been met, the fourth method step 208 is carried out. The reverse sequence is also possible.

In the fourth method step 208 it is contemplated to additionally actuate a display of the motor vehicle 700 to display a visual warning and/or to additionally actuate at least one loudspeaker of the motor vehicle 700 to emit an acoustic warning that no executable function is assigned to the operating element 12.

Figure 3A:
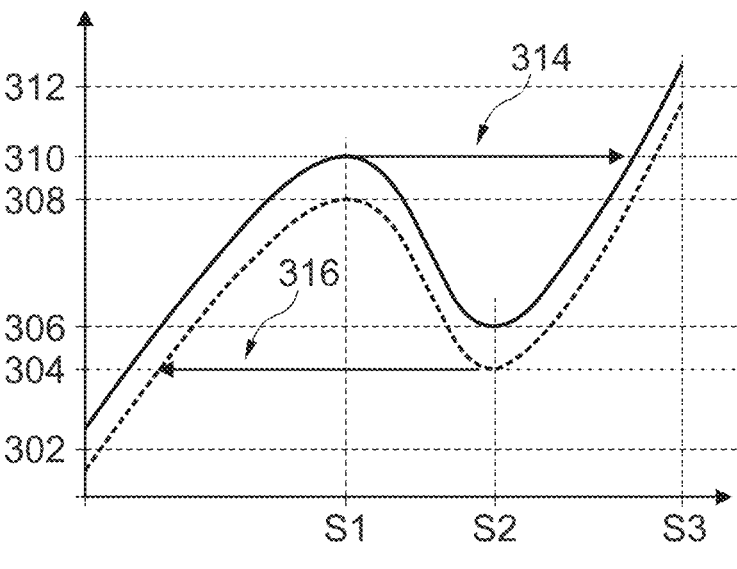
FIGS. 3A and 3B show a comparison of the restoring force (vertical axis) over the stroke (horizontal axis) for a conventional mechanical button with a passive haptic (FIG. 3A) and the active haptic operating element according to an optional embodiment (FIG. 3B)
Figure 3B:
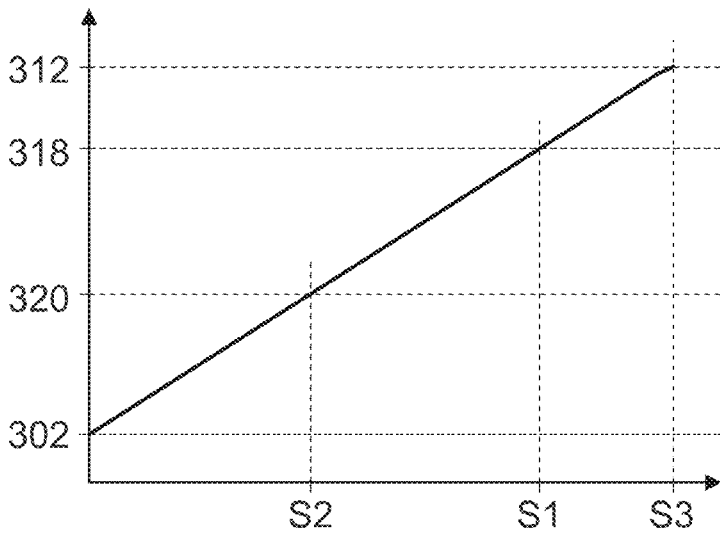

FIGS. 3A and 3B show a comparison of the restoring force (vertical axis) over the stroke (horizontal axis) for a conventional mechanical button with passive haptics (FIG. 3A) and an active haptic operating element 12 according to an optional embodiment for the purpose of explaining the technological background.

In the case of the conventional mechanical button, the plotted horizontal auxiliary lines herein identify a pre-load force 302, a return threshold 304, a snap 306, a return snap 308, a switching threshold 310 and a detent 312. The threshold values S1, S2, and S3 herein indicate reaching the switching threshold 310, the snap 306 and the detent 312. A snap herein can comprise latching, or a latching movement. When activating the conventional button with passive haptics, the finger "drops" into the switching point when overcoming the switching threshold 310 (indicated by the arrow 314). When releasing or relieving the button by reducing the pressure acting on the button, the finger is pushed back, as is indicated by arrow 316. As a result a haptic feedback when pushing and releasing, or relieving, the button is provided in a passive way.

As opposed to the conventional mechanical button, the restoring force (vertical axis) in the case of an active haptic operating element 12 can optionally run linearly to the stroke (horizontal axis), as is shown by way of example in FIG. 3B. The auxiliary lines for the pre-load force 302 and the detent 312 are plotted herein for facilitating the orientation, as are a switching threshold for an active haptic feedback 318, i.e. the positive feedback or the negative feedback, and a return threshold 320 for providing an optional active haptic feedback for pointing out the return threshold 320. As a result of the linear profile it can be achieved that the effort in terms of force for activating the operating element 12 can be perceived to be linearly elastic.

Figure 4A:
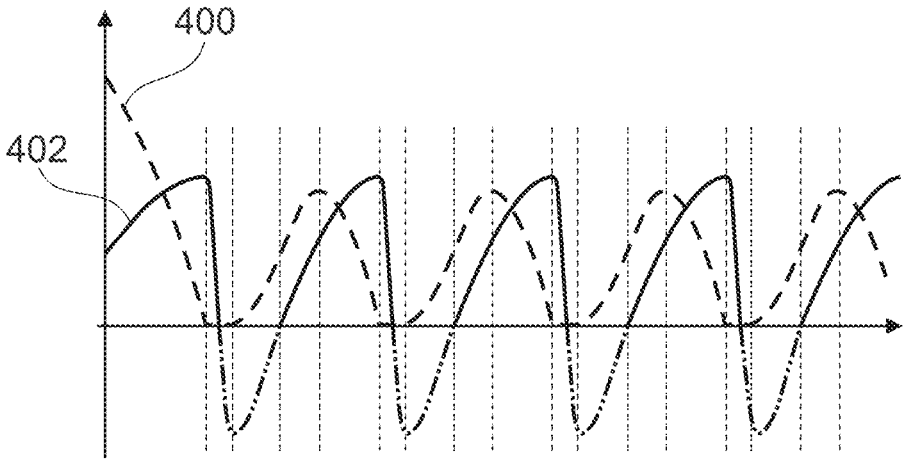
FIGS. 4A and 4B show, by way of example, a comparison for the temporal profile of the finger travel and the finger force when activating a conventional mechanical button multiple times (FIG. 4A) and the active haptic operating unit according to an optional embodiment (FIG. 4B)
Figure 4B:
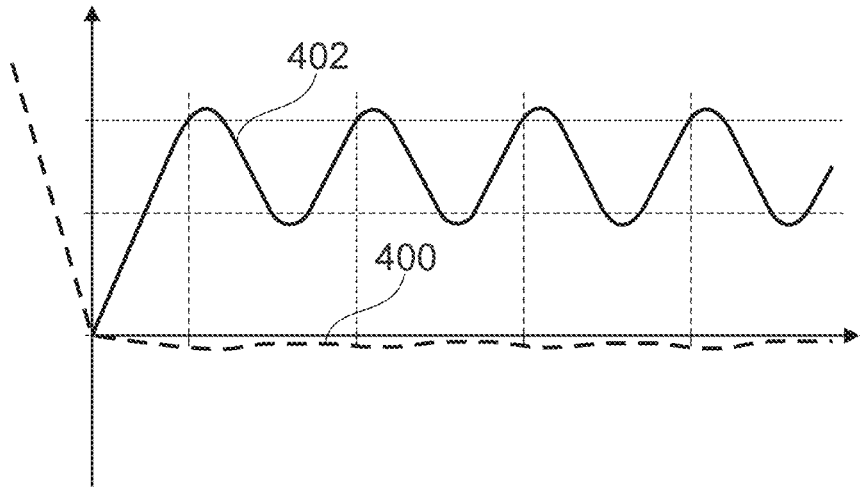

By way of example, FIGS. 4A and 4B show a comparison for the temporal profile of the finger travel 400 and of the finger force 402 when activating a conventional mechanical button (FIG. 4A) and the active haptic operating unit 12 according to an optional embodiment (FIG. 4B) multiple times. The auxiliary lines herein indicate switching thresholds, return thresholds and switching procedures. It can be seen here that, by means of the active haptic operating element 12, the multiple activation of the active haptic operating element 12 can be implemented with a significantly shorter finger travel, or finger stroke, than in the case of a conventional mechanical button.

The operating element 12 shown in FIG. 1 can optionally be activatable in a first switching position and in a second switching position. If this is the case, it can thus be differentiated in an optional method step 203 of the method 200 (in FIG. 2) whether there is an activation of the operating element 12 in the first switching position or in the second switching position if an activation of the operating element 12 has been determined.

For differentiating the two switching positions, the active haptic positive feedback 502 can comprise a first active haptic positive feedback 502a when there is an activation of the operating element 12 in the first switching position, and a second active haptic positive feedback 502b when there is an activation of the operating element 12 in the second switching position. In this way, the operating element 12 in the third method step 206 can be actuated to emit the first active haptic positive feedback 502a when an activation of the operating element 12 has been determined in the first switching position, or to emit the second active haptic positive feedback 502b when an activation of the operating element 12 in the second switching position has been determined.

Alternatively or additionally, the active haptic negative feedback 504 can comprise a first active haptic negative feedback 504a when there is an activation of the operating element 12 in the first switching position, and a second active haptic negative feedback 504b when there is an activation of the operating element 12 in the second switching position. In this way, the operating element 12 in the fourth method step 208 can be actuated to emit the first active haptic negative feedback 504a when an activation of the operating element 12 has been detected in the first switching position, or to emit the second active haptic negative feedback 504b when an activation of the operating element 12 has been determined in the second switching position.

There can be an activation of the operating element 12 in the first switching position by exceeding a first switching threshold 318a, and there can be an activation of the operating element in the second switching position by exceeding a second switching threshold 318b, the exceeding of the second switching threshold 318b occurring in an activation movement which is in the same direction as and is more pronounced than an activation movement for exceeding the first switching threshold 318a. The more pronounced activation movement herein can consist of a greater activating force, or comprise a greater activating force.

An activation of the operating element 12 in the first switching position or in the second switching position can be differentiated in that an activation of the operating element 12 in the first switching position can be determined when the first switching threshold 318a is exceeded once a first return threshold 320a has been exceeded, and an activation of the operating element 12 in the second switching position can be determined when the second switching threshold 318b has been exceeded once a second return threshold 320b has been exceeded. The first return threshold 320a can be formed below the second return threshold 320b, and the second return threshold 320b can be formed below the first switching threshold 318a.

FIG. 5A schematically shows the relative arrangement of the first and the second switching threshold 318a, 318b, and of the first and the second return threshold 320a and 320b in a diagram which illustrates the finger force 402 on the vertical axis. The emission of the active haptic positive feedback 502, or of the active haptic negative feedback 504, when exceeding the first switching threshold 318a, and the emission of an optional positive feedback 506, or of an optional negative feedback 508, when falling short of the return threshold 320a are indicated on the right-hand side in FIG. 5A.

FIG. 5B shows a case in which the first switching position and the second switching position of the active haptic operating element 12 are differentiated by separate types of active haptic feedback. Emitting the first active haptic positive feedback 502a, or the first active haptic negative feedback 504a, respectively, herein occurs when exceeding the first switching threshold 318a, emitting a first positive return signal 506a, or a first negative return signal 508a, respectively, occurs when falling short of the first return threshold 320a, emitting the second active haptic positive feedback 502b, or the second active haptic negative feedback 504b, respectively, occurs when exceeding the second switching threshold 318b, and emitting a second positive return signal 506b, or a second negative return signal 508b, respectively, occurs when falling short of the second return threshold 320b. The first active haptic positive feedback 502a, the second active haptic positive feedback 502b, the first active haptic negative feedback 504a, and the second active haptic negative feedback 506b herein can differ from one another. Optionally, the first positive return signal 506a, the first negative return signal 508a, the second positive return signal 506b and the second negative return signal 508b can also differ from one another.

It is further contemplated that the active haptic operating element 12 is repeatedly switchable between the first switching position and the second switching position by means of repeatedly exceeding the second switching threshold 318b and repeatedly falling short of the second return threshold 320b, without completely canceling an activation of the activation element 12. This can be performed in particular by not falling short of the first return threshold 320a.

This is illustrated by way of example in FIG. 6 with the graphs 600, wherein the graph illustrates the finger force (vertical axis) in relation to time (horizontal axis). The vertical auxiliary lines herein identify the individual switching procedures. Graph 602 shows a case in which the operating element 12 is repeatedly moved to the first switching position 318a without activating the operating element 12 in the second switching position 318b in the meantime. In this way, this enables a simple and intuitive operation of the operating element 12 with a plurality of different switching positions, without a significant finger travel being required for this purpose. Instead, a frequent and selective activation of the operating element 12 can be performed by way of a targeted variation of the finger force, or of the pressure acting on the operating element 12, respectively.

FIG. 7 by way of example shows the motor vehicle 700 having a steering wheel 702, wherein this steering wheel 702 has the operating unit 10 according to the disclosure having the (at least one) operating element 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

10 Operating unit
12 Active haptic operating element
14 Control device
16 Actuator
18 Force sensor
20 Bearing point
100 Effective direction of the actuator
102 Force direction of the user input
200 Method for actuating the active haptic operating element
202-208 Method steps
302 Pre-load force
304 Return threshold
306 Snap
308 Return snap
310 Switching threshold
312 Detent
314 Dropping into switching point
316 Pushback of finger
318 Switching threshold for the active haptic feedback
318a First switching threshold
318b Second switching threshold
320 Return threshold
320a First return threshold 320b Second return threshold
400 Finger travel
402 Finger force
502 Active haptic positive feedback
502a First active haptic positive feedback
502b Second active haptic positive feedback
504 Active haptic positive feedback
504a First active haptic positive feedback
504b Second active haptic positive feedback
506 Return signal
506a First positive return signal
506b Second positive return signal
508a First negative return signal
508b Second negative return signal
600, 602 Graphs
700 Motor vehicle
702 Steering wheel

What is claimed is:

1. An apparatus, comprising:
a control device for actuating an active haptic operating element for a motor vehicle, the control device being operatively configured to:
  determine whether there is an activation of the operating element;
  determine whether the operating element is assigned an available function when an activation of the operating elements has been determined;
  actuate the operating element to emit an active haptic positive feedback when an activation of the operating element has been determined, and there has been a determination that the operating element is assigned an executable function; and
  actuate the operating element to emit an active haptic negative feedback when an activation of the operating element has been determined, and there has been a determination that no executable function is assigned to the operating element,
  wherein the active haptic positive feedback and the active haptic negative feedback differ from one another; and
wherein the control device is further configured to at least one of:
  additionally actuate a display of the motor vehicle in order to display a visual warning when an activation of the operating element has been determined, and there has been a determination that no executable function is assigned to the operating element; or
  additionally actuate at least one loudspeaker of the motor vehicle in order to emit an acoustic warning when an activation of the operating element has been determined, and there has been a determination that no executable function is assigned to the operating element.

2. The apparatus according to claim 1, wherein the control device is further configured to determine whether the operating element is assigned an available function, so as to:
  establish that no executable function is assigned when
    (i) no function is permanently or temporarily assigned,
    (ii) an assigned function is not executable because a condition is not met, and/or
    an assigned function is not executable due to a fault.

3. An active haptic operating unit for a motor vehicle, comprising:
  the apparatus according to claim 1; and
  the active haptic operating element.

4. A motor vehicle comprising the active haptic operating unit according to claim 3.

5. An apparatus, comprising:

a control device for actuating an active haptic operating element for a motor vehicle, the control device being operatively configured to:

determine whether there is an activation of the operating element, wherein the operating element is activatable in a first switching position and in a second switching position;

determine whether the operating element is assigned an available function when an activation of the operating elements has been determined;

actuate the operating element to emit an active haptic positive feedback when an activation of the operating element has been determined, and there has been a determination that the operating element is assigned an executable function; and actuate the operating element to emit an active haptic negative feedback when an activation of the operating element has been determined, and there has been a determination that no executable function is assigned to the operating element, wherein the active haptic positive feedback and the active haptic negative feedback differ from one another; and wherein the control device is further configured to:

differentiate whether there is an activation of the operating element in the first switching position or in the second switching position when an activation of the operating element has been determined, wherein at least one of:

(i) the active haptic positive feedback comprises a first active haptic positive feedback when there is an activation of the operating element in the first switching position, and a second active haptic positive feedback when there is an activation of the operating element in the second switching position; or (ii) the active haptic negative feedback comprises a first active haptic negative feedback when there is an activation of the operating element in the first switching position, and a second active haptic negative feedback when there is an activation of the operating element in the second switching position.

6. The apparatus according to claim 5, wherein there is an activation of the operating element in the first switching position by exceeding a first switching threshold, and there is an activation of the operating element in the second switching position by exceeding a second switching threshold, wherein the exceeding of the second switching threshold occurs in an activation movement which is in a same direction as, and is more pronounced than, an activation movement for exceeding the first switching threshold.

7. The apparatus according to claim 6, wherein the more pronounced activation movement requires a greater activating force.

8. The apparatus according to claim 6, wherein the control device is further configured to differentiate so as to:

determine an activation of the operating element in the first switching position when the first switching threshold is exceeded once a first return threshold has been exceeded; and determine an activation of the operating element in the second switching position when the second switching threshold has been exceeded once a second return threshold has been exceeded, wherein the first return threshold is configured below the second return threshold, and the second return threshold is configured below the first switching threshold.

9. A method for actuating an active haptic operating element for a motor vehicle, the method comprising:

determining whether there is an activation of the operating element;

determining whether the operating element is assigned an available function when an activation of the operating element has been determined;

actuating the operating element to emit an active haptic positive feedback when an activation of the operating element has been determined, and there has been a determination that the operating element is assigned an executable function; and actuating the operating element to emit an active haptic negative feedback when an activation of the operating element has been determined, and there has been a determination that no executable function is assigned to the operating element, wherein the active haptic positive feedback and the active haptic negative feedback differ from one another; and at least one of:

additionally actuating a display of the motor vehicle in order to display a visual warning when an activation of the operating element has been determined, and there has been a determination that no executable function is assigned to the operating element; or additionally actuating at least one loudspeaker of the motor vehicle in order to emit an acoustic warning when an activation of the operating element has been determined, and there has been a determination that no executable function is assigned to the operating element.

\* \* \* \* \*